United States Patent
Putnam et al.

(10) Patent No.: US 11,980,830 B1
(45) Date of Patent: May 14, 2024

(54) SNOW BRICK

(71) Applicants: Jim D. Putnam, Hudson, OH (US); Lara J. Putnam, Hudson, OH (US)

(72) Inventors: Jim D. Putnam, Hudson, OH (US); Lara J. Putnam, Hudson, OH (US)

( * ) Notice: Subject to any disclaimer, the term of this patent is extended or adjusted under 35 U.S.C. 154(b) by 681 days.

(21) Appl. No.: 16/806,549

(22) Filed: Mar. 2, 2020

Related U.S. Application Data

(60) Provisional application No. 62/812,610, filed on Mar. 1, 2019.

(51) Int. Cl.
| | |
|---|---|
| *B29C 43/02* | (2006.01) |
| *A63H 33/32* | (2006.01) |
| *B29C 43/00* | (2006.01) |
| *B29C 43/36* | (2006.01) |
| *B29C 43/50* | (2006.01) |
| *B29L 31/10* | (2006.01) |

(52) U.S. Cl.
CPC ........... *A63H 33/32* (2013.01); *B29C 43/006* (2013.01); *B29C 43/02* (2013.01); *B29C 43/36* (2013.01); *B29C 43/50* (2013.01); *B29K 2901/00* (2013.01); *B29L 2031/102* (2013.01)

(58) Field of Classification Search
CPC ...... A63H 33/32; B29C 43/006; B29C 43/02; B29C 43/36; B29C 43/50; B29K 2901/00; B29L 2031/102
USPC ........................................................ 264/334
See application file for complete search history.

(56) References Cited

U.S. PATENT DOCUMENTS

| | | | | |
|---|---|---|---|---|
| 3,059,273 A | * | 10/1962 | Blevins, Jr. ............ | A63H 33/00 425/408 |
| 3,822,976 A | * | 7/1974 | Moonan ................ | A47J 43/282 425/281 |
| 4,721,449 A | * | 1/1988 | Alberts ................. | A47J 43/282 425/286 |
| 5,368,465 A | * | 11/1994 | Wanderer .............. | A47J 43/282 425/279 |
| 2008/0090668 A1 | * | 4/2008 | Freres ................... | A63H 33/32 472/126 |
| 2008/0307680 A1 | * | 12/2008 | Schlichting ............... | E01H 5/02 37/225 |
| 2015/0110913 A1 | * | 4/2015 | Ulrich .................... | A23G 9/28 425/276 |
| 2015/0151211 A1 | * | 6/2015 | Drylie .................. | A63H 33/001 446/85 |

(Continued)

FOREIGN PATENT DOCUMENTS

| | | | | | |
|---|---|---|---|---|---|
| GB | | 2340027 A | * | 2/2000 | ......... A47G 19/2205 |

OTHER PUBLICATIONS

Ideal Sno-Brick Maker, Colors May Vary Kids Outdoor Snow Activity. Printed Jun. 4, 2020. 9 pages. https://www.amazon.com/Ideal-0C8329BL-Sno-Brick-Maker/dp/B0063ITNII.

(Continued)

*Primary Examiner* — Jeffrey M Wollschlager
*Assistant Examiner* — Xue H Liu
(74) *Attorney, Agent, or Firm* — Vorys, Sater, Seymour and Pease LLP; Mark A. Watkins

(57) ABSTRACT

The invention relates to molds that are used to craft snow or sand into different shapes. Specifically, the present invention provides a mechanism for compressing the snow or sand, then assisting in the compression of the snow or sand, and/or assisting with the ejection of the same from the mold in order to produce an improved shape.

12 Claims, 5 Drawing Sheets

(56) References Cited

U.S. PATENT DOCUMENTS

2017/0144080 A1* 5/2017 McMahon ................ F25C 5/14

OTHER PUBLICATIONS

Airhead Snow Brick Maker. Printed Jun. 4, 2020. 6 pages. https://www.amazon.com/Airhead-AHST-101-AIRHEAD-Brick-Maker/dp/B01N3JHRUC.
Makezine. Printed Jun. 4, 2020. 8 pages. https://makezine.com/2015/03/02/build-the-best-snow-fort-on-the-block-with-this-diy-snow-brick-mold/.

* cited by examiner

SNOW BRICK

CROSS-REFERENCE TO RELATED APPLICATION

This application claims the benefit of priority from U.S. Provisional Patent Application Ser. No. 62/812,610 filed Mar. 1, 2019, the disclosures of which are incorporated herein by reference.

BACKGROUND

The invention relates to toys that are used to craft snow and sand, and which are simple molds available in a variety of sizes and shapes. Malleable material such as snow or sand fills the mold which is then inverted and the material leaves the mold in the desired shape. Prior art designs include a fixed handle above the mold body and the hollow shape to be filled. Molds are typically injection-molded plastic in various colors. The challenge of using these prior art designs with malleable materials is the ejection of the final shape. The force needed to eject the snow or sand is often great enough to damage the final shape and/or render it unusable.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

The present invention seeks to improve on the usability of plastic molds for malleable materials such as snow and sand by offering a means of compressing the material inside the mold and as a means of extraction. This improvement on a static mold ensures a complete ejection of a well-formed brick or other shape. Compression also packs the material in the mold, making a more durable as well as giving it an improved structural appearance. Using a combination of three separate components an improved final shape is created that is stronger and better formed than single piece molds. This technology and principle can be applied to all closed polygonal shapes.

In accordance with one aspect of the present disclosure disclosed is a mold for malleable materials. The mold includes a shell having one or more side walls and a defined depth, said shell having one open end, and one closed end, said closed end having one or more openings. The mold also includes a handle assembly having a handle, and a compression plate having a shape and dimension similar to and slightly smaller than the interior of said shell, and such that said handle assembly can travel within the interior of said shell, along at least a portion of its depth.

In accordance with one aspect of the present disclosure disclosed is a method for constructing compressed shapes of malleable material from a mold. The method includes (a) retracting the handle assembly of the mold to a position near the closed end of the shell. The method also includes (b) filling the interior of the mold shell with malleable material. The method further includes (c) moving the handle assembly along the depth of said shell toward the open end of the shell thereby compressing said malleable material within the shell against a stationary surface. Optionally, the method includes (d) retracting said handle assembly toward the closed end of the shell and adding additional malleable material to the interior of said mold and repeating the process of step (c). The method includes (e) moving the handle assembly within the interior of said shell toward its open so as to eject the now compressed malleable material.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
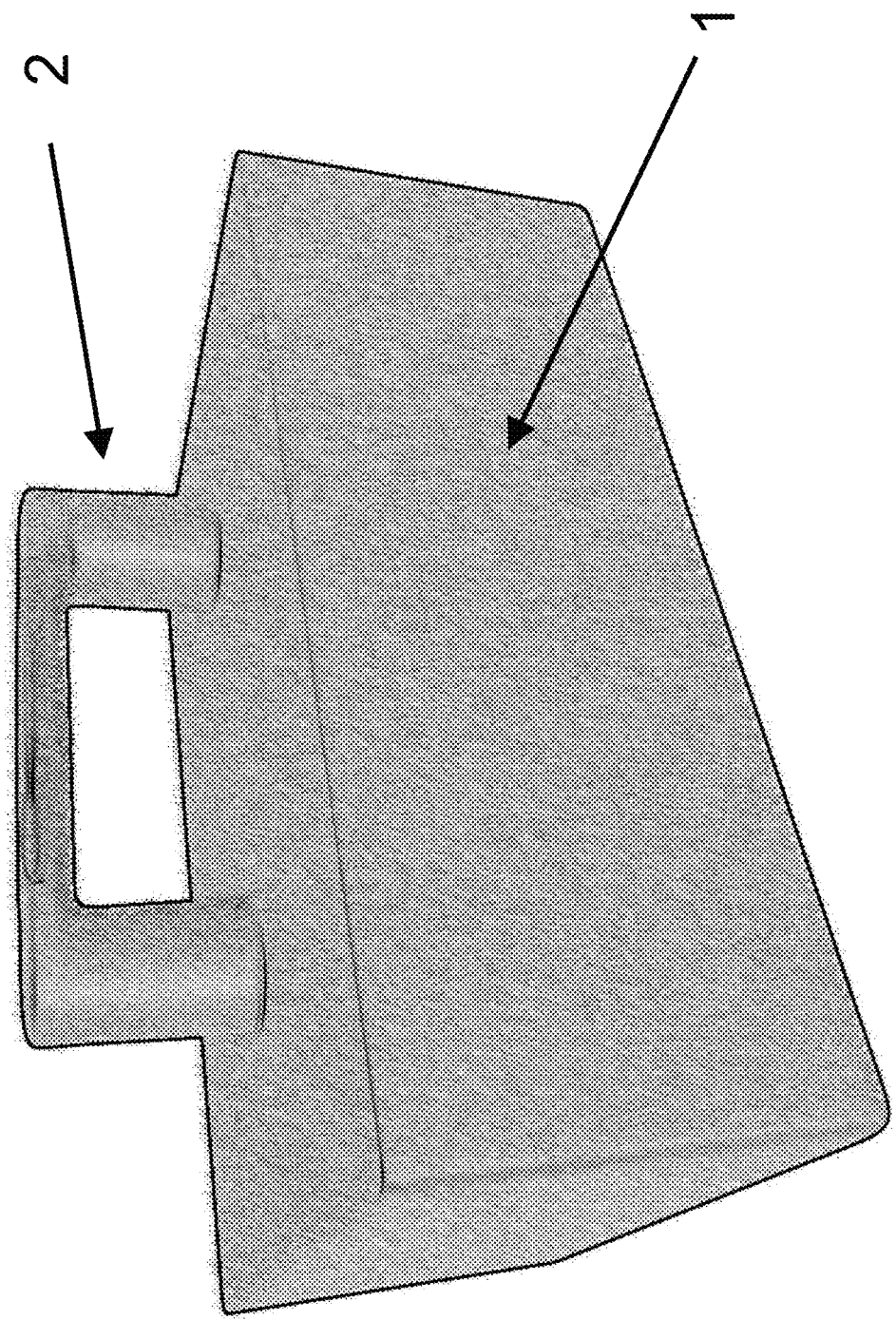
FIG. 1 is an image of the brick crafting device according to the present invention.

A more complete understanding of the components, processes and apparatuses disclosed herein can be obtained by reference to the accompanying drawings. These figures are merely schematic representations based on convenience and the ease of demonstrating the present disclosure, and are therefore not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

FIG. 1 is an image of the brick crafting device according to the present invention. The external components are a body shell (1) that forms the rectangular shape from the snow or sand input and the overhead handle (2) that slides through channels along the inside of the body shell to compress the material.

Figure 2:
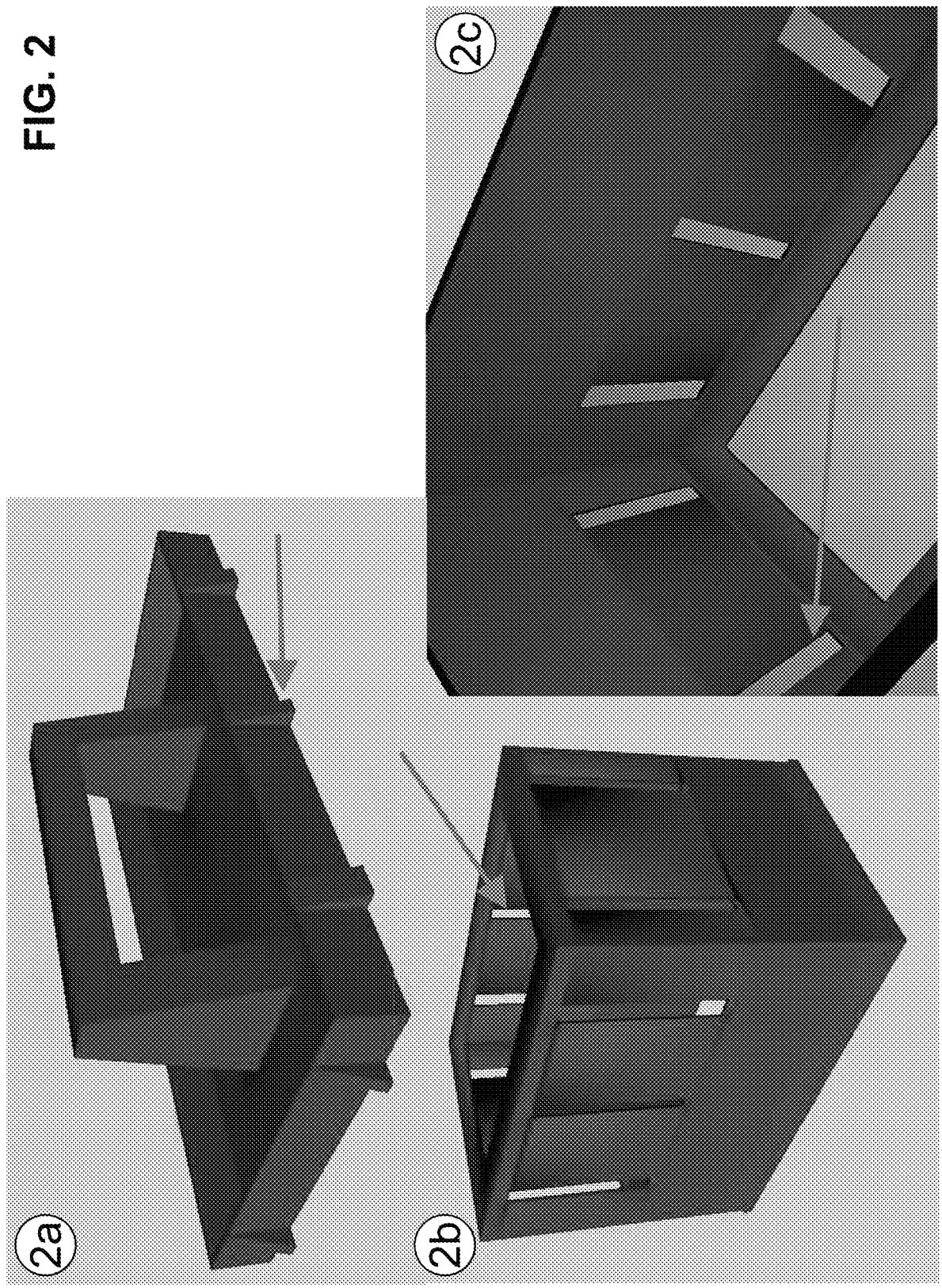
FIG. 2 is a series of images illustrating a 2-piece design of an exemplary brick crafting device.

FIG. 2 is a series of images illustrating a 2-piece design. An image of the handle assembly (2a) that travels inside the body shell (1) for compression of the malleable material. The handle has one or more small guide protrusions around its outer periphery that fit in the guide channels of the body. The body shell (1) employs one or more guide channels (2b) around its periphery to guide the handle assembly (2a) to resist turning within the body shell (1) and ensure a close fit on compression. The closed end can include a protruding lip extending around the periphery of the one or more openings, such that the molded press can be prevented from removal from the shell (as seen in 2c). The interconnection fit between guide protrusions and channels (2c) controls the travel of the handle to compress the material and eject it, while preventing the handle from detaching from the body once assembled. Such a male-female interconnection fit can be made of various configurations known in the art, with either portion of the interconnection fit located on either piece of the invention. The handle preferably protrudes from the top of the body shell an adequate distance to allow the handle to travel down and compress the snow or sand material inside the body shell, or it may be depressed into the space defined by the shell in order to produce a smaller shaped brick of malleable material. The handle can be of varying sizes and configurations, and in one embodiment is preferably shaped with enough clearance above the body to be gripped with gloved hands of different aged users (2).

Figure 3:
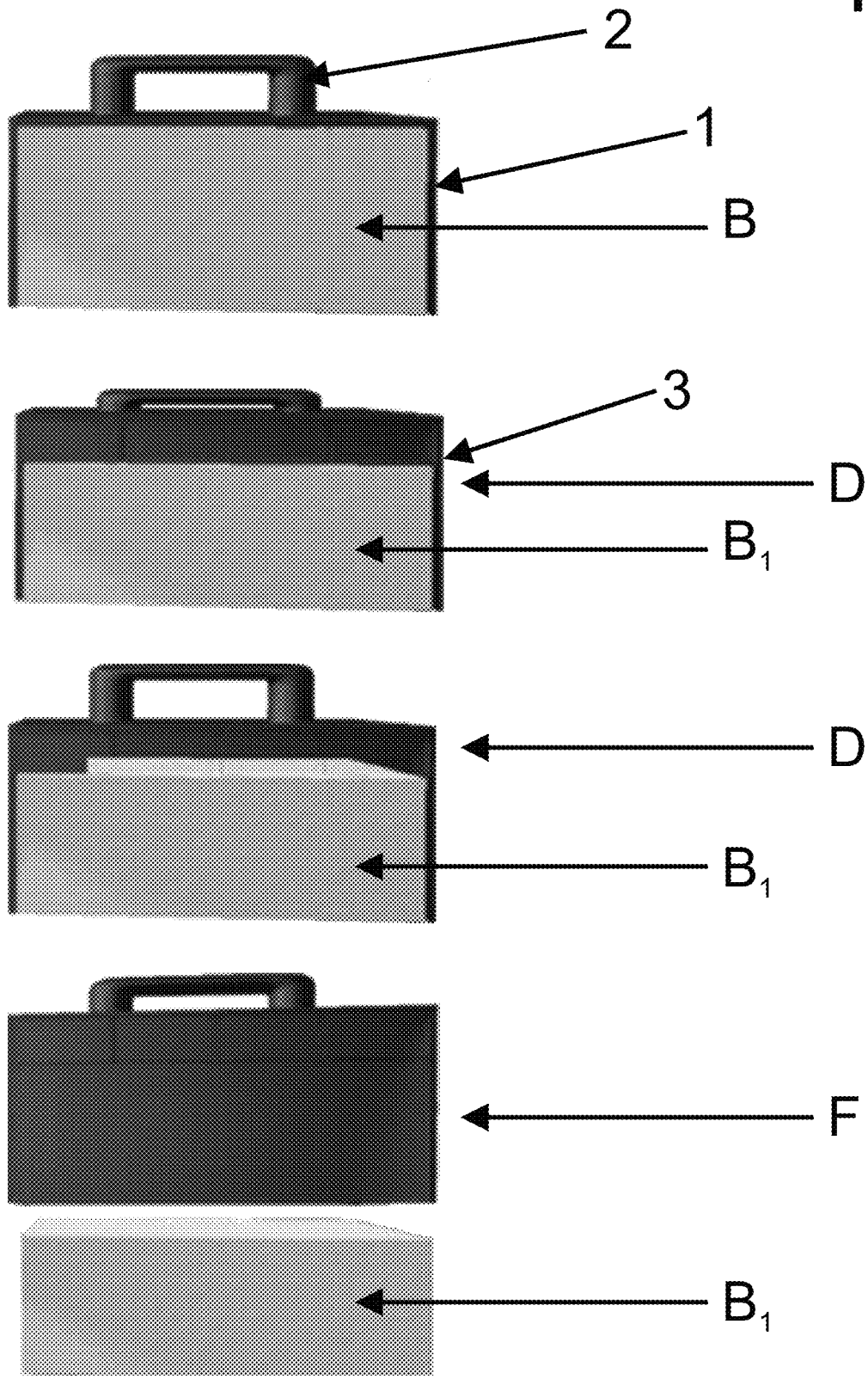
FIG. 3 demonstrates a process of forming a play brick using this embodiment of the present invention shown in FIGS. 1 and 2.

FIG. 3 demonstrates the process of forming a play brick using this embodiment of the present invention shown in FIGS. 1 and 2. With the handle assembly (2a) installed within the body shell (1), the body shell mold (1) is filled with snow or sand (B) (commonly to the top of the mold) and the handle (2) is pushed by said material to its highest position within the body shell (1). During the compression step, the handle assembly is pushed down against a stationary surface until the material is compressed into a harder and better formed shape (B1) inside the mold. The handle may stopped by an internal bevel in the interior of the body shell (1) to allow the handle to be pulled back away from the compressed material, perhaps even to the original position (D). Compression has three effects on the process: first, to press the material, second to better form the final shape, and third to help eject the final brick shape from the mold (F). These actions differentiate the brick maker of the present invention from simple fixed molds of the prior art and supply an improved final shape for play.

Figure 4:
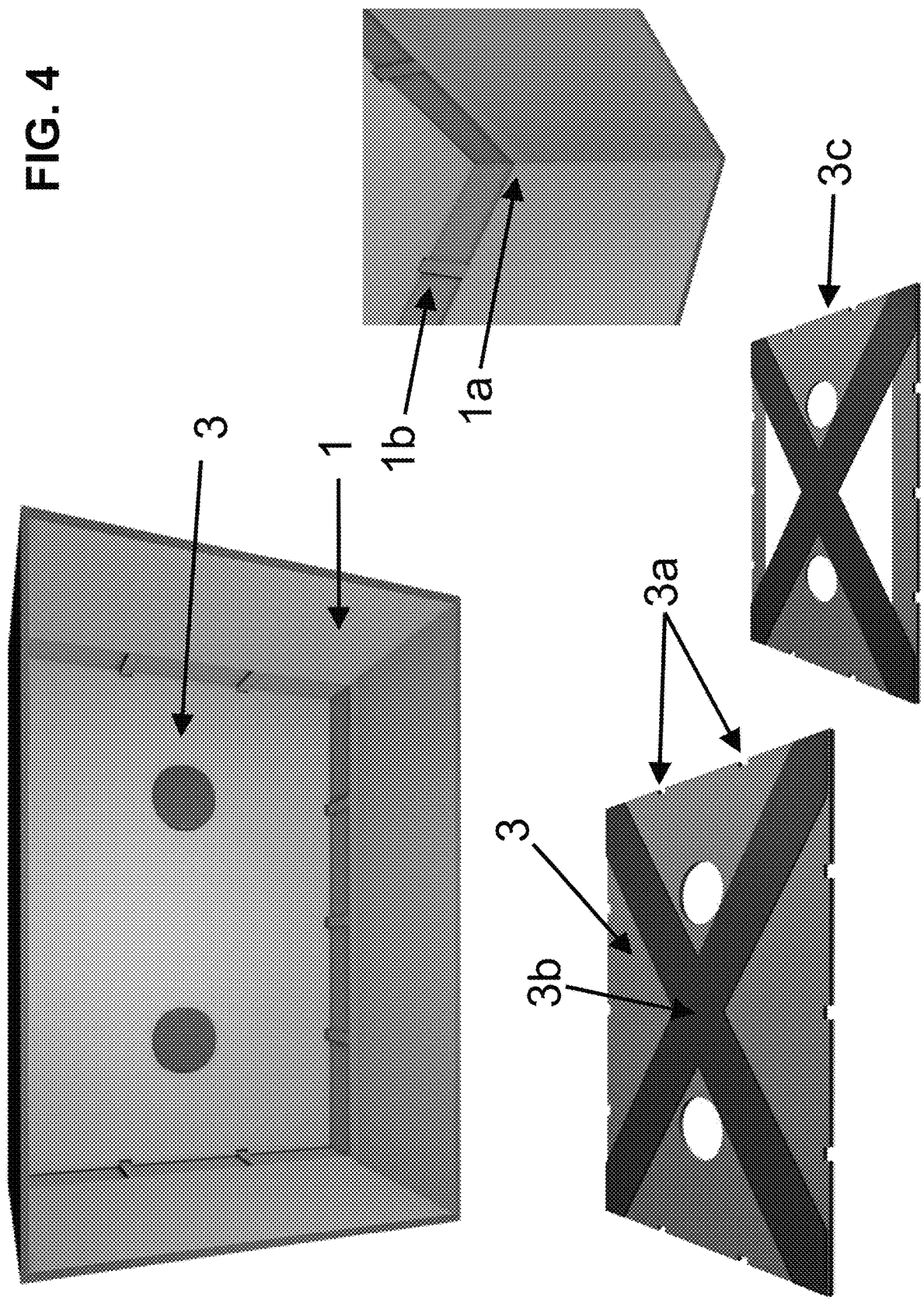
FIG. 4 illustrates an alternative design using three parts in accordance with the present disclosure.

FIG. 4 illustrates an alternative design using three parts. The inner handle itself is composed of a single molded piece as well as a crossing reinforcements (3b) that support the structure during compression and resist warping over time. The inner handle has edge grooves (3a) which are aligned to the molded channel guides (1b) of the body shell. The handle assembly of either embodiment could have perforations that would allow snow to be removed from above the inner handle (3c).

Figure 5:
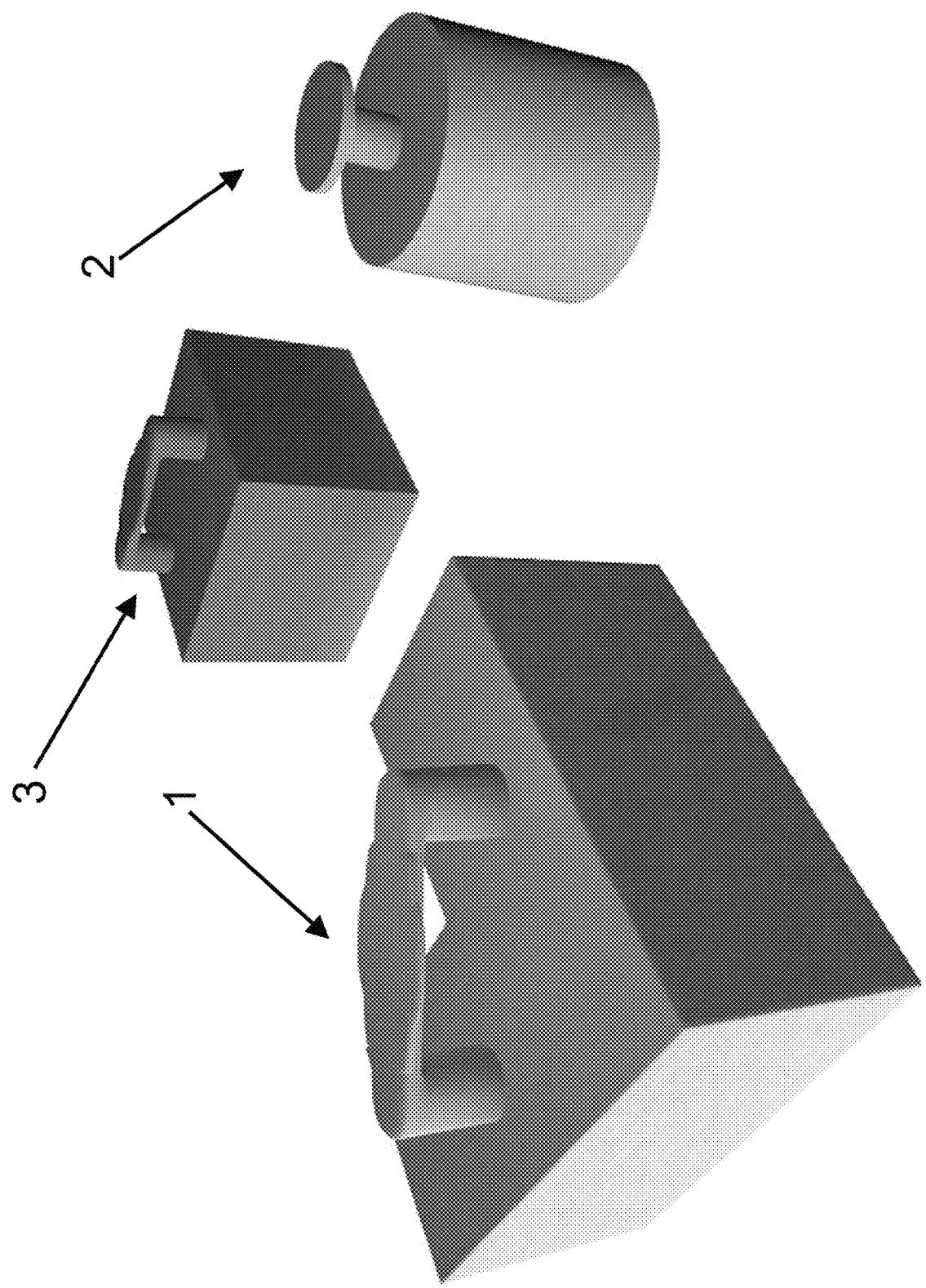
FIG. 5 illustrates three examples of alternative shapes in accordance with the present disclosure.

By way of example, FIG. 5 illustrates three examples of alternative shapes that use the same technology and process, such as a corner shape (1), a cylinder (2), and a square (3). Other shapes that could apply the same technology and principles include square, triangular, and any other closed polygonal shape.

The production process may utilize injection molding of polymer material to provide adequate flexibility and temperature resistance to the body. Other production methods that could produce similar qualities could be utilized, including but not limited to 3D printing. One embodiment of the present invention would have side walls of approximately between 3-5 millimeters thickness, thereby giving the device a slight degree of flexibility yet be rigid enough to form a sufficiently solid block of material. Potential materials for construction could include polymer plastics as well as thin, non-corroding metals such as aluminum. Different materials could be used for different parts, such as a more rigid or thicker component for the inner handle to resist bending or wear over time. A non-stick coating could also be applied to the interior walls to reduce friction and ease the ejection of the finished brick.

This invention will be expected to be functional and not subject to damage across a wide range of temperature and conditions. Recitation of materials and dimensions are presented by way of example only and should not be construed in any way as limiting the scope of the present disclosure.

What is claimed is:

1. A mold for malleable materials comprising:
  a shell having one or more side walls and a defined depth, said shell having one open end, and one closed end, said closed end having one or more openings; and
  a singular molded press having a plate portion configured to travel within the interior of said shell, along at least a portion of its depth and a handle portion extending from a top surface of the plate portion and accessible through the one or more openings of the closed end, wherein the handle portion is configured to translate through the one or more openings of the closed end of the shell,
  wherein the handle portion extends through multiple openings of the closed end, and wherein the handle portion is fixed to the top surface of the plate portion at multiple locations.

2. The mold for malleable material as recited in claim 1 wherein the shell is manufactured from a polymer material.

3. The mold for malleable material as recited in claim 1 wherein the handle portion is manufactured from a polymer material.

4. The mold for malleable material as recited in claim 1 where said plate portion further comprises reinforcements to aid in retaining its shape.

5. The mold for malleable material as recited in claim 1, wherein the plate portion includes a plurality of grooves configured to slidlingly engage with correspondingly aligned guide rails.

6. The mold for malleable materials according to claim 1, further comprising a plurality of guide rails located on the interior surface of the shell and a plurality of guide channels located at a periphery of the plate portion, wherein the plurality of guide rails and the plurality of guide channels are configured to guide the handle portion along a path within the interior of said shell.

7. The mold for malleable material as recited in claim 6, wherein the plurality of guide rails located on the interior surface extend partway along the depth of the shell.

8. The mold for malleable materials of claim 1, wherein the handle portion extends from a first location of the top surface of the plate portion, through a first hole of the closed end, through a second hole of the closed end, and to a second location of the top surface of the plate portion.

9. A mold for malleable materials comprising:
  a body shell having one or more side walls with a plurality of guide channels; and
  a handle assembly positioned within the body shell, wherein the handle assembly includes a handle, wherein the handle assembly further includes a plurality of guide protrusions around an outer periphery of the handle assembly, wherein the plurality of guide protrusions are housed within the plurality of guide channels, and wherein an interconnection fit between the plurality of guide protrusions and the plurality of guide channels controls a travel of the handle assembly while preventing the handle assembly from detaching from the body shell,
  wherein the plurality of guide protrusions are tapered such that a first end of the plurality of guide protrusions extend further into the plurality of guide channels than a second end of the plurality of guide protrusions, and wherein the first end of the plurality of guide protrusions are further from the handle than the second end of the plurality of guide protrusions.

10. The mold for malleable materials of claim 9, wherein the body shell further comprises a lip extending around a periphery of a first end of the body shell.

11. The mold for malleable materials of claim 10, wherein a lip is configured to prevent the handle assembly from exiting the first end of the body shell, wherein the interconnection fit between the plurality of guide protrusions and the plurality of guide channels prevents the handle assembly from exiting a second end of the body shell, and wherein the first end of the body shell is opposite the second end of the body shell.

12. The mold for malleable materials of claim 11, wherein translation of the travel of the handle assembly is restricted between the lip of the shell body and an end of the plurality of guide channels.

\* \* \* \* \*